US009230476B2

(12) United States Patent
Park et al.

(10) Patent No.: US 9,230,476 B2
(45) Date of Patent: Jan. 5, 2016

(54) METHOD AND ELECTRONIC DEVICE FOR REDUCING POWER CONSUMPTION OF DISPLAY

(71) Applicant: Samsung Electronics Co. Ltd., Suwon-si, Gyeonggi-do (KR)

(72) Inventors: Kyung-Min Park, Seoul (KR); Dong-Hwa Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 14/026,278

(22) Filed: Sep. 13, 2013

(65) Prior Publication Data

US 2014/0104298 A1 Apr. 17, 2014

(30) Foreign Application Priority Data

Oct. 16, 2012 (KR) ........................ 10-2012-0114962

(51) Int. Cl.

| | |
|---|---|
| ***G09G 5/10*** | (2006.01) |
| ***G09G 5/30*** | (2006.01) |
| ***G09G 3/28*** | (2013.01) |
| ***H04N 1/60*** | (2006.01) |
| ***H04N 5/57*** | (2006.01) |
| ***H04N 9/73*** | (2006.01) |
| ***G09G 3/32*** | (2006.01) |

(52) U.S. Cl.

CPC ................ *G09G 3/3225* (2013.01); *G09G 5/10* (2013.01); *G09G 2320/0626* (2013.01); *G09G 2330/021* (2013.01); *G09G 2340/0407* (2013.01); *G09G 2340/0428* (2013.01); *G09G 2340/0435* (2013.01)

(58) Field of Classification Search

CPC combination set(s) only.
See application file for complete search history.

(56) References Cited

U.S. PATENT DOCUMENTS

| | | | | |
|---|---|---|---|---|
| 6,185,454 | B1 * | 2/2001 | Thompson | 607/2 |
| 2002/0021275 | A1 | 2/2002 | Kataoka et al. | |
| 2003/0128198 | A1 | 7/2003 | Mizuyabu et al. | |
| 2005/0068311 | A1 | 3/2005 | Fletcher et al. | |
| 2005/0134547 | A1 * | 6/2005 | Wyatt | 345/102 |
| 2005/0168490 | A1 * | 8/2005 | Takahara | 345/690 |
| 2006/0101293 | A1 | 5/2006 | Chandley et al. | |
| 2007/0080905 | A1 * | 4/2007 | Takahara | 345/76 |
| 2007/0243850 | A1 * | 10/2007 | Arai | 455/343.1 |
| 2008/0143728 | A1 | 6/2008 | Gorla et al. | |
| 2010/0149167 | A1 * | 6/2010 | Hasegawa et al. | 345/213 |
| 2011/0074737 | A1 * | 3/2011 | Hsieh et al. | 345/175 |
| 2014/0122911 | A1 * | 5/2014 | Gunn et al. | 713/323 |
| 2014/0354624 | A1 * | 12/2014 | Chaji | 345/212 |

FOREIGN PATENT DOCUMENTS

KR 10-2005-0060033 A 6/2005

* cited by examiner

*Primary Examiner* — Wesner Sajous
(74) *Attorney, Agent, or Firm* — Jefferson IP Law, LLP

(57) ABSTRACT

A method for reducing power consumption of an electronic device. The method includes setting a luminance of a display to a minimum, and reducing a data amount sent to the display.

8 Claims, 8 Drawing Sheets

METHOD AND ELECTRONIC DEVICE FOR REDUCING POWER CONSUMPTION OF DISPLAY

PRIORITY

The present application claims the benefit under 35 U.S.C. §119(a) to a Korean patent application filed in the Korean Intellectual Property Office on Oct. 16, 2012, and assigned Serial No. 10-2012-0114962, the entire disclosure of which is hereby incorporated by reference.

TECHNICAL FIELD OF THE INVENTION

1. Field of the Invention

The present invention relates generally to a display device. More particularly, the present invention relates to a method and an apparatus for reducing power consumption of a display device.

2. Description of the Related Art

In accordance with rapid development of electronic devices such as a smart phone and a tablet Personal Computer (PC), the electronic device enabling a wireless voice call and information exchange becomes necessary for daily life. When it was first introduced, the electronic device provided the features of portability and wireless communication. As technology has advanced and wireless Internet is introduced, advanced portable terminals are now provided as multimedia devices supporting functions such as schedule management, games, remote control, image capturing, and projector, to thus meet user's demands.

Recently, an electronic device supporting high resolution is recently introduced for the sake of video display. While the recent electronic device supporting the high resolution displays a bright and vivid screen, it consumes considerable power to display such a bright and vivid screen. As such, the recent electronic device consumes more power. When the remaining battery power of the electronic device falls below a certain level, the electronic device enters a dimming mode which automatically dims the screen, to reduce its power consumption. However, an Active Matrix Organic Light Emitting Diode (AMOLED) display even in the dimming mode provides the brighter and clearer screen than other displays according to AMOLED characteristics, and accordingly consumes more power than the other displays. In this regard, a method for reducing the power consumption of the electronic device is required.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention to provide a method and an apparatus for reducing power consumption of a display in an electronic device.

Another aspect of the present invention is to provide a method and an apparatus for controlling luminance of a display in an electronic device.

Yet another aspect of the present invention is to provide a method and an apparatus for controlling a data amount sent to a display in an electronic device.

Still another aspect of the present invention is to provide a method and an apparatus for lowering an interface clock of a display in an electronic device.

A further aspect of the present invention is to provide a method and an apparatus for lowering a refresh rate of a display in an electronic device.

In accordance with an aspect of the present invention, a method for reducing power consumption of an electronic device is provided. The method includes setting a luminance of a display to a minimum, and reducing a data amount sent to the display.

In accordance with another aspect of the present invention, an electronic device for reducing power consumption is provided. The electronic device includes one or more processors, a display, a memory, and one or more programs stored in the memory and configured for execution by the one or more processors. The one or more programs include an instruction for minimizing a luminance of the display and reducing a data amount sent to the display.

In accordance with another aspect of the present invention, an electronic device for reducing power consumption is provided. The electronic device includes one or more processors, a display, and a memory. The processor minimizes a luminance of the display and reduces a data amount sent to the display.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an electronic device represents a portable electronic device such as portable terminal, mobile phone, media player, tablet computer, handheld computer, or Personal Digital Assistant (PDA). The electronic device can be an electronic device combining two or more functions of those devices.

Figure 1A:
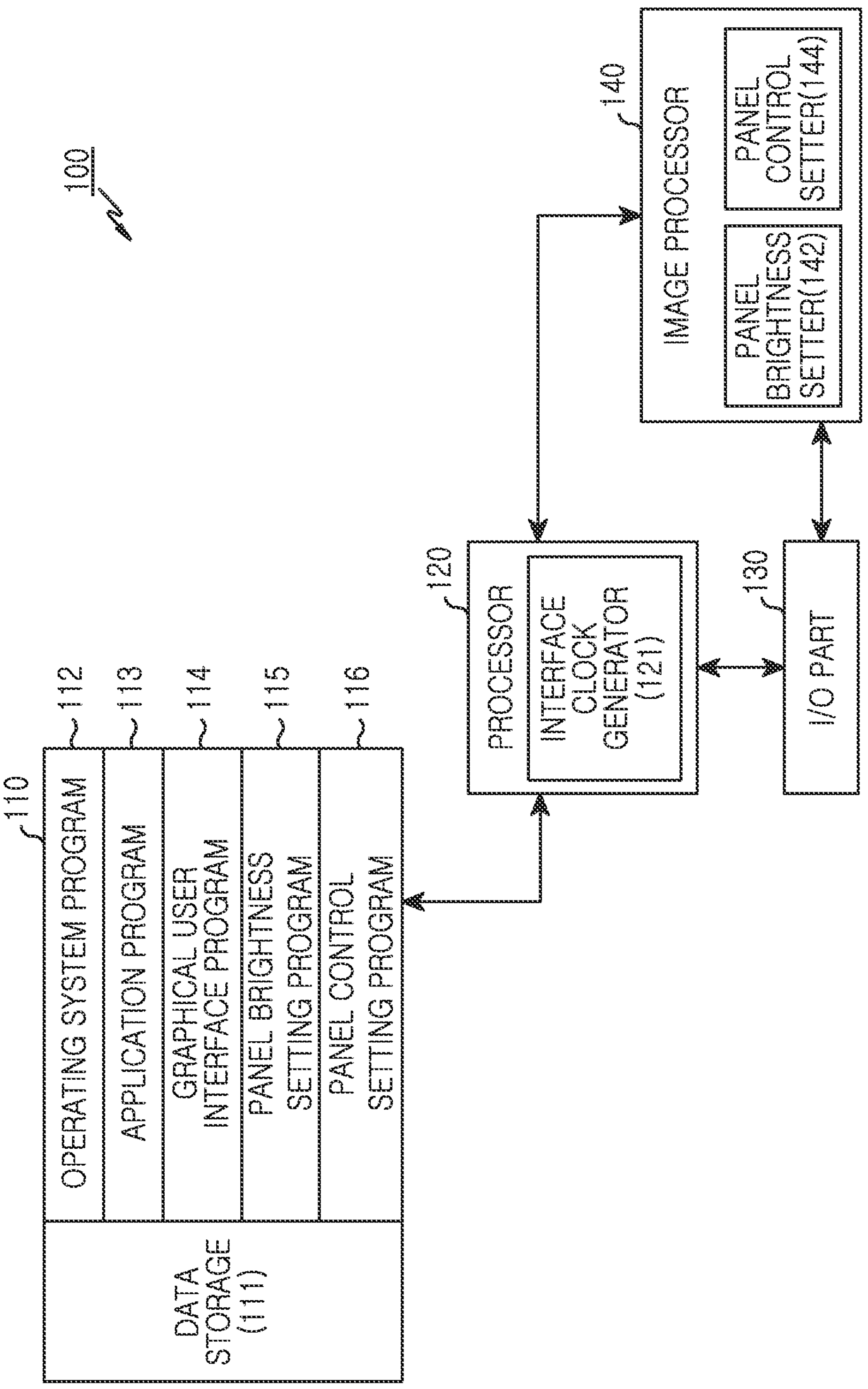
FIG. 1A is a block diagram of an electronic device for reducing power consumption of a display according to an exemplary embodiment of the present invention.
Figure 2A:
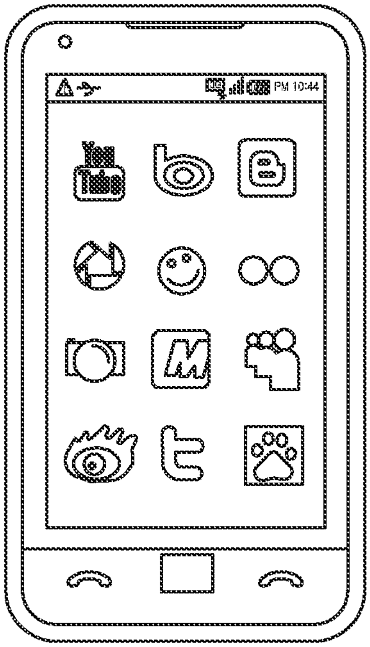
FIG. 2A is a diagram of a screen displayed in an electronic device according to an exemplary embodiment of the present invention.
Figure 2B:
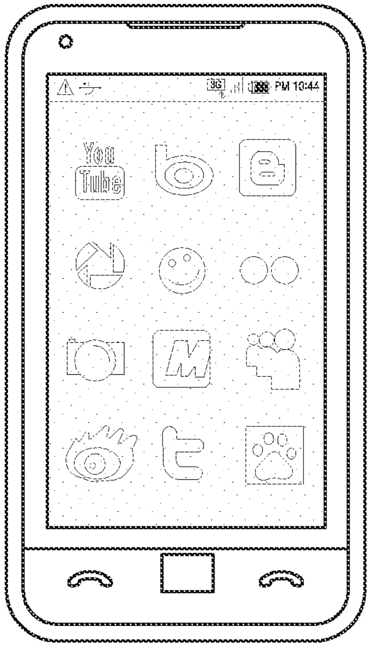
FIG. 2B is a diagram of a screen in a dimming mode of an electronic device according to an exemplary embodiment of the present invention.

FIG. 1A is a block diagram of an electronic device for reducing power consumption of a display according to an exemplary embodiment of the present invention. FIG. 2A is a diagram of a screen displayed in an electronic device according to an exemplary embodiment of the present invention. FIG. 2B is a diagram of a screen in a dimming mode of an electronic device according to an exemplary embodiment of the present invention Referring to FIG. 1A, the electronic device 100 includes a memory 110, a processor 120, an Input/Output (I/O) part 130, and an image processor 140. A plurality of memories 110 and a plurality of processors 120 can be equipped.

The memory 110 includes a data storage 111, an operating system program 112, an application program 113, a graphical user interface program 114, a panel brightness setting program 115, and a panel control setting program 116. The program being a software component can be represented as a set of instructions. Accordingly, the program may be referred to as an instruction set. The program may be also referred to as a module.

The memory 110 can store one or more programs including instructions for realizing exemplary embodiments of the present invention.

The data storage 111 stores data generated in the function execution corresponding to the program stored in the memory 110. The data storage 111 can store refresh rate and interface clock (or interface clock frequency) information of a dimming mode, and refresh rate and interface clock information of a normal mode. Herein, the dimming mode is a mode for setting luminance of the I/O part 130 to the lowest luminance so as to reduce the power consumption of the electronic device 100. Herein, the luminance indicates an intensity of visual stimuli of a screen being displayed, and embraces brightness of the displayed screen. The refresh rate is the number of times that the I/O part 130 displays an image, and indicates the number of times that the image processor 140 accesses the memory 110 or an output buffer to read the image.

The operating system program 112 (e.g., the embedded operating system such as WINDOWS, LINUX, Darwin, RTXC, UNIX, OS X, or VxWorks) includes various software components for controlling general system operations. These include, e.g., memory management and control, storage hardware (device) control and management, and power control and management. The operating system program 112 processes normal communication between various hardware (devices) and software components (programs).

The application program 113 includes applications such as browser, e-mail, message, word processing, address book, widget, Digital Right Management (DRM), voice recognition, voice reproduction, position determining function, location based service, call, and video.

The graphical user interface program 114 includes at least one software component for providing a user interface using graphics between a user and the electronic device 100. That is, the graphical user interface program 114 includes at least one software component for displaying user interface information on the I/O part 130. For example, the graphical user interface program 114 includes an instruction for displaying a particular image on the I/O part 130 according to the set refresh rate. For example, the graphical user interface program 114 includes the instruction for displaying a video on the I/O part 130 for 60 times in a second according to the refresh rate of 60 Hz. The graphical user interface program 114 includes an instruction for displaying the image by controlling the brightness of the I/O part 130 in the dimming mode. For example, in the dimming mode, the graphical user interface program 114 includes the instruction for displaying the video in the lowest luminance.

The panel brightness setting program 115 includes an instruction for setting the brightness of the I/O part 130. More specifically, in the dimming mode, the panel brightness setting program 115 includes the instruction for minimizing the luminance of the I/O part 130. For example, in the dimming mode, the panel brightness setting program 115 includes an instruction for displaying the video with the brightness of 30 Candela (CD). For example, an Active Matrix Organic Light Emitting Diode (AMOLED) display includes transistors corresponding to R/G/B subpixels of each display pixel of the screen. Hence, the panel brightness setting program 115 can decrease the luminance by controlling emission of the self-emitting device by reducing current supplied to the transistors of the AMOLED display, and thus dim the image.

In the dimming mode, the panel control setting program 116 includes an instruction for controlling a data amount provided to the I/O part 130 by controlling the panel brightness setting program 115. The panel control setting program 116 includes an instruction for decreasing the refresh rate in the dimming mode. More specifically, in the dimming mode, the panel control setting program 116 includes the instruction for decreasing the number of times that the I/O part 130 displays the image and the number of times that the image processor 140 accesses the memory 110 or the output buffer in order to read the image. In so doing, as the refresh rate decreases, the data amount sent to the I/O part 130 also declines.

The panel control setting program 116 includes an instruction for lowering both of the refresh rate and the interface clock in the dimming mode. In detail, in the dimming mode, the panel control setting program 116 includes the instruction for decreasing the number of times that the I/O part 130 displays the image and the number of times that the image processor 140 accesses the output buffer to read the image by lowering the refresh rate, and for concurrently decreasing the data amount sent from the memory 110 to the image processor 140 and the data amount sent from the image processor 140 to the I/O part 130 by lowering the interface clock. Herein, the panel control setting program 116 can include an instruction for decreasing the refresh rate and the interface clock by a preset hopping unit or to the refresh rate and the interface clock of the dimming mode prestored in the data storage 111. The panel control setting program 116 may also include an instruction for lowering only the interface clock according to current relationship between the refresh rate and the interface clock of the electronic device 100. For example, when the current interface clock is higher than a minimum interface clock against the refresh rate in the electronic device 100, the panel control setting program 116 can include the instruction for decreasing only the interface clock.

The processor 120 includes an interface clock generator 121. The processor 120 can include at least one processor (not shown) and a peripheral interface (not shown). The processor 120 executes a particular program (instruction set) stored in the memory 110 and conducts particular functions corresponding to the program. In particular, when a particular menu is selected to enter the dimming mode according to a user control or when the remaining battery power falls below a threshold, the processor 120 switches the display mode of the electronic device 100 from the normal mode to the dimming mode. For example, when a bright screen is displayed as shown in FIG. 2A, the processor 120 can switch from the normal mode to the dimming mode according to the user control or the remaining battery power and thus dim the screen as shown in FIG. 2B. Further, in the dimming mode, the processor 120 controls and processes to dim the I/O part 130 using the panel brightness setting program 115 and to lessen the data amount sent to the I/O part 130 using the panel control setting program 116.

The interface clock generator 121 can generate a clock signal according to the interface clock defined by a panel control setter 144 and thus lessen the data amount sent from the memory 110 to the image processor 140 and the data amount sent from the image processor 140 to the I/O part 130. For example, the interface clock generator 121 decreases the output clock signal of 500 MHz to 400 MHz and thus provides the interface clock signal to the memory 110, the image processor 140, and the I/O part 130.

The I/O part 130 includes an input device for inputting data and an output device for outputting data, and thus provides the interface to the user. For example, the I/O part 130 can be a touch screen for inputting and outputting data at the same time. The I/O part 130 can include a display panel for adjusting the screen luminance. The I/O part 130 can display the image stored in the output buffer of the image processor 140. Further, when the processor 120 sets the dimming mode, the I/O part 130 can display the image in the lowest luminance according to a panel brightness setter 142 and the panel control setter 144. For example, when the I/O part 130 employs the AMOLED display, it includes the transistors corresponding to the R/G/B subpixels of each display pixel of the screen and thus can display the image displayed on the screen with the minimum luminance by controlling the emission of the self-emitting device according to the current supplied to the transistors.

The image processor 140 includes the panel brightness setter 142 and the panel control setter 144. The image processor 140 can include the output buffer (not shown) for temporarily storing the data to display, and provide the data stored in the output buffer to the I/O part 130. In so doing, the image processor 140 obtains the data from the output buffer based on the refresh rate and the interface clock signal which dynamically change, and provides the data to the I/O part 130.

The panel brightness setter 142 can adjust the luminance of the I/O part 130 according to the brightness set by the panel brightness setting program 115. For example, in the dimming mode, the panel brightness setter 142 can minimize the luminance of the I/O part 130 according to the brightness set by the panel brightness setting program 115.

The panel brightness setter 142 controls the refresh rate under the control of the panel control setting program 116 and controls to alter the clock frequency generated by the interface clock generator 121. For example, in the dimming mode, the panel brightness setter 142 reduces the refresh rate from 60 Hz to 40 Hz under the control of the panel control setting program 116 and requests the interface clock generator 121 to change the clock frequency from 500 MHz to 400 MHz.

Figure 1B:
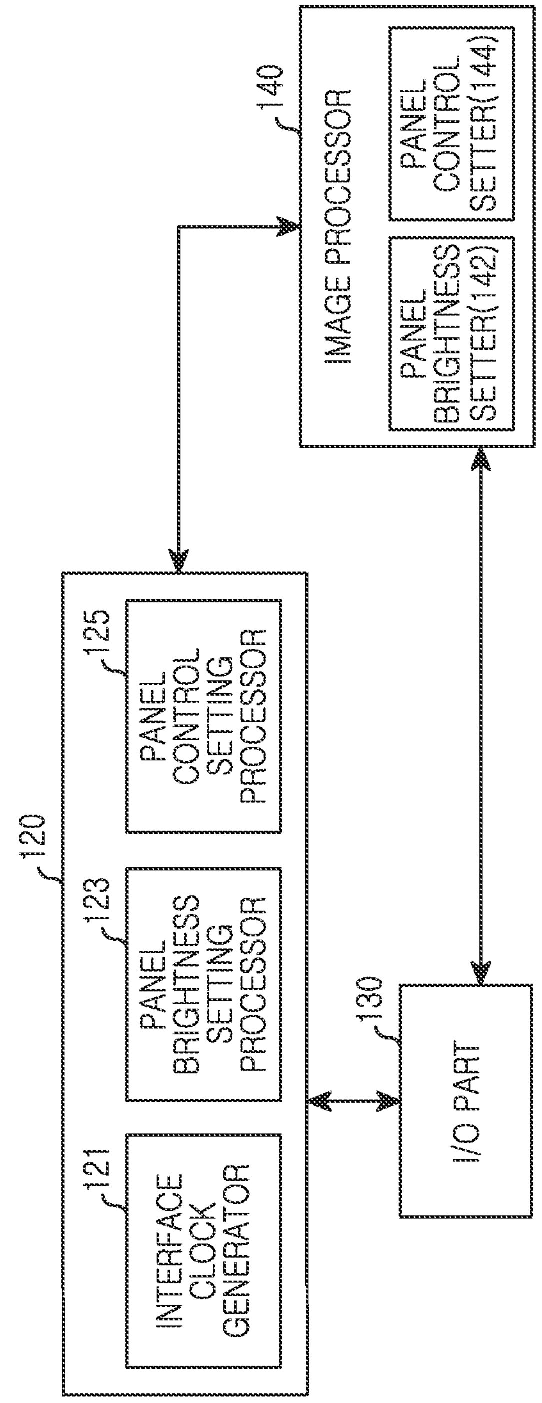
FIG. 1B is a block diagram of a processor for reducing power consumption of a display according to an exemplary embodiment of the present invention.

FIG. 1B depicts a processor for reducing power consumption of a display according to an exemplary embodiment of the present invention.

Referring to FIG. 1B, the processor 120 includes the interface clock generator 121, a panel brightness setting processor 123, and a panel control setting processor 125.

The panel brightness setting processor 123 includes an instruction for setting the brightness of the I/O part 130. More specifically, in the dimming mode, the panel brightness setting processor 123 includes the instruction for minimizing the luminance of the I/O part 130. For example, in the dimming mode, the panel brightness setting processor 123 includes the instruction for displaying the video in 30 CD. For example, the AMOLED display includes the transistors corresponding to the R/G/B subpixels of each display pixel of the screen. Hence, the panel brightness setting processor 123 can control the emission of the self-emitting device by reducing the current supplied to the transistors of the AMOLED display, and thus decrease the luminance and dim the image.

In the dimming mode, the panel control setting processor 125 includes an instruction for controlling the data amount sent to the I/O part 130 by controlling the panel brightness setting processor 123. First, in the dimming mode, the panel control setting processor 125 includes an instruction for lowering the refresh rate. More specifically, in the dimming mode, the panel control setting processor 125 includes the instruction for lowering the number of times that the I/O part 130 displays the image and the number of times that the image processor 140, which includes the panel brightness setter 142 and the panel control setter 144, accesses the memory 110 or the output buffer to read the image. In so doing, as the refresh rate decreases, the data amount sent to the I/O part 130 also declines.

The panel control setting processor 125 includes the instruction for lowering both of the refresh rate and the interface clock in the dimming mode. In detail, in the dimming mode, the panel control setting processor 125 includes the instruction for decreasing the number of times that the I/O part 130 displays the image and the number of times that the image processor 140 accesses the output buffer to read the image by lowering the refresh rate, and for concurrently decreasing the data amount sent from the memory 110 to the image processor 140 and the data amount sent from the image processor 140 to the I/O part 130 by lowering the interface clock. Herein, the panel control setting processor 125 can include the instruction for lowering the refresh rate and the interface clock by the preset hopping unit or to the refresh rate and the interface clock of the dimming mode prestored in the data storage 111. The panel control setting processor 125 may also include the instruction for lowering only the interface clock according to the current relationship between the refresh rate and the interface clock of the electronic device 100. For example, when the current interface clock is higher than the minimum interface clock against the refresh rate in the electronic device 100, the panel control setting processor 125 can include the instruction for decreasing only the interface clock.

Figure 3A:
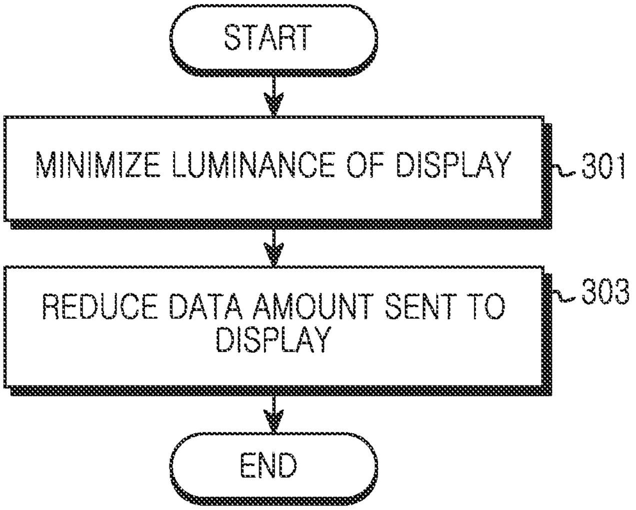
FIG. 3A is a flowchart of a method for reducing power consumption by decreasing a data amount sent to a display in an electronic device according to an exemplary embodiment of the present invention.

FIG. 3A is a flowchart of a method for reducing power consumption by decreasing a data amount sent to a display in an electronic device according to an exemplary embodiment of the present invention.

Referring to FIG. 3A, the electronic device 100 minimizes the luminance of the display in operation 301. More specifically, when the particular menu is selected to enter the dimming mode according to the user control or when the remaining battery power falls below the threshold, the electronic device 100 can determine its display mode as the dimming mode and minimize the luminance of the display. The dimming mode is the mode for setting the luminance of the display to the lowest display luminance so as to reduce the power consumption of the electronic device 100.

In operation 303, the electronic device 100 reduces the data amount sent to the display. In so doing, the electronic device 100 can reduce the data amount sent to the display by lowering at least one of the refresh rate and the interface clock. Hence, the electronic device 100 can set the luminance of the display lower than the luminance of a related-art dimming mode and ultimately reduce its power consumption.

Figure 3B:
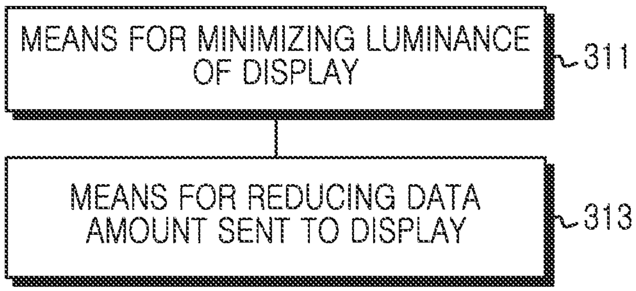
FIG. 3B is a diagram of means for reducing power consumption by decreasing a data amount sent to a display in an electronic device according to an exemplary embodiment of the present invention.

FIG. 3B depicts means for reducing power consumption by decreasing a data amount sent to a display in an electronic device according to an exemplary embodiment of the present invention.

Referring to FIG. 3B, the electronic device 100 includes a means 311 for minimizing the luminance of the display. In so doing, the electronic device 100 can include the display panel for adjusting the luminance of the display. The electronic device 100 also includes a means 313 for reducing the data amount sent to the display. In so doing, the electronic device 100 can lessen the data amount sent to the display by reducing at least one of the refresh rate and the interface clock. The electronic device 100 can include an interface clock generator (e.g., Central Processing Unit (CPU)) for adjusting the interface clock.

Figure 4:
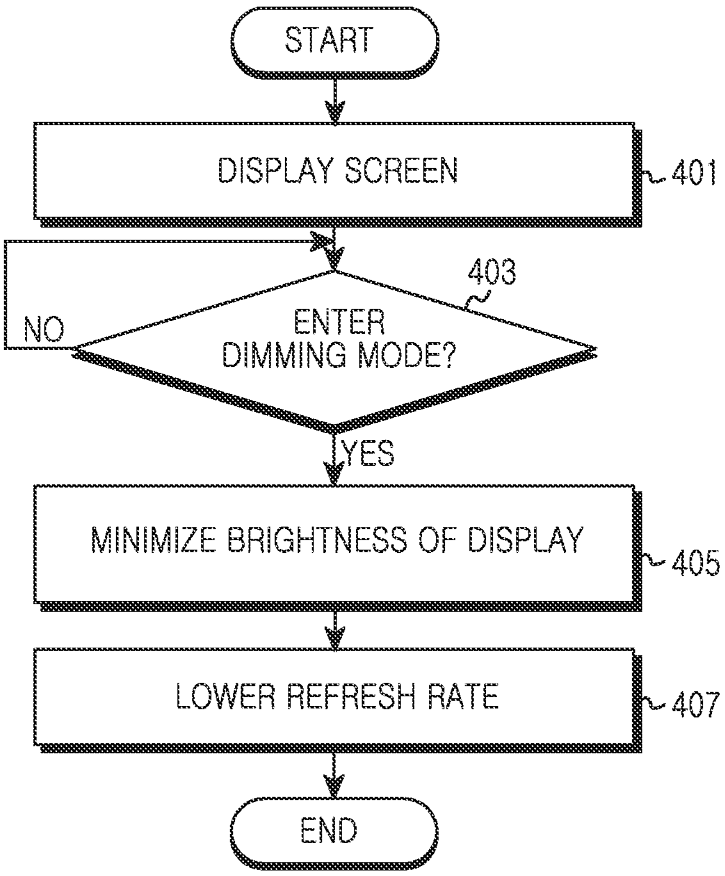
FIG. 4 is a flowchart of a method for lowering a refresh rate in a dimming mode of an electronic device according to an exemplary embodiment of the present invention.

FIG. 4 is a flowchart of a method for reducing power consumption by lowering a refresh rate in a dimming mode of an electronic device according to an exemplary embodiment of the present invention.

Referring to FIG. 4, after displaying the screen in operation 401, the electronic device 100 determines whether the dimming mode is set in operation 403. In so doing, the dimming mode is the mode for minimizing the luminance of the display so as to reduce the power consumption of the electronic device 100. The dimming mode can be set when the particular menu is selected according to the user control or when the remaining battery power falls below the threshold.

In the dimming mode, the electronic device 100 minimizes the brightness of the display in operation 405. More specifically, in the dimming mode, the electronic device 100 can display the dimmer screen by minimizing the luminance of the display, and thus reduce the power consumption. For example, when the display of the electronic device 100 supports the AMOLED type, the electronic device 100 can control the emission of the self-emitting device by reducing the current supplied to the transistors corresponding to the R/G/B subpixels of each display pixel of the screen, and thus minimize the brightness of the display.

In operation 407, the electronic device 100 lowers the refresh rate. Herein, the refresh rate is the number of times that the display displays the image, and indicates the number of access times to the output buffer in order to read the image. By decreasing the number of times that the display displays the image and the number of access times to the output buffer, the electronic device 100 can display a dimmer screen than the screen of the related-art dimming mode and consequently reduce the power consumption. For example, the electronic device 100 using Mobile Industry Processor Interface (MIPI) can decrease the refresh rate from 60 Hz to 40 Hz. Accordingly, the power consumption of the electronic device 100 is declined from 295 mA to 275 mA. In so doing, the electronic device 100 can lower the refresh rate by the preset hopping unit or to the refresh rate of the dimming mode prestored in the data storage 111.

Figure 5:
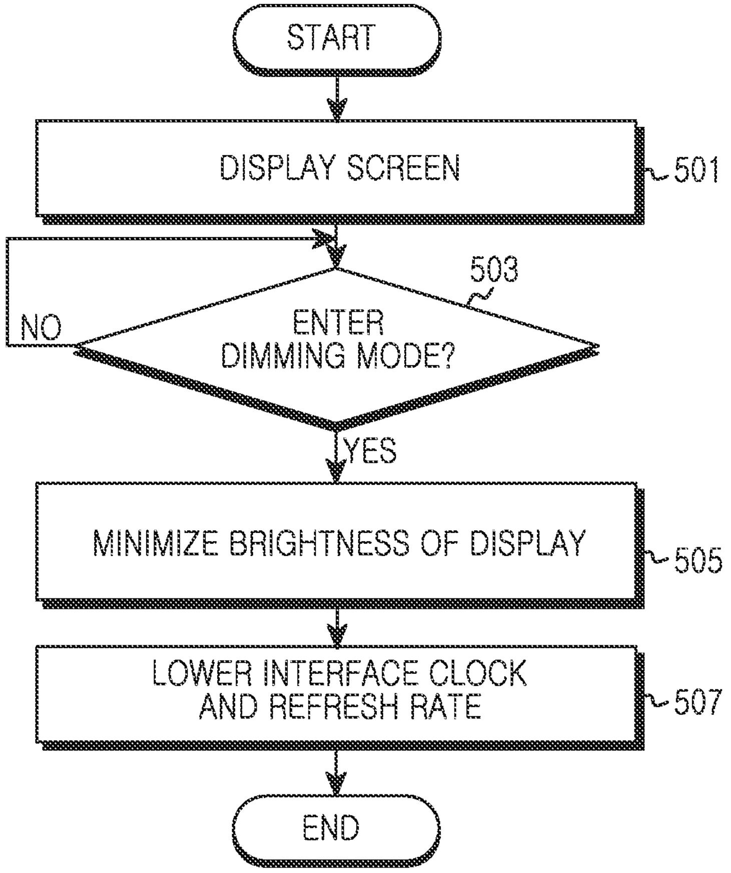
FIG. 5 is a flowchart of a method for lowering an interface clock and a refresh rate in a dimming mode of an electronic device according to another exemplary embodiment of the present invention.

FIG. 5 is a flowchart of a method for reducing power consumption by lowering an interface clock and a refresh rate in a dimming mode of an electronic device according to another exemplary embodiment of the present invention.

Referring to FIG. 5, after displaying the screen in operation 501, the electronic device 100 determines whether the dimming mode is set in operation 503. In so doing, the dimming mode is the mode for minimizing the luminance of the display so as to reduce the power consumption of the electronic device 100. The dimming mode can be entered when the particular menu is selected according to the user control or the remaining battery power falls below the threshold.

In the dimming mode, the electronic device 100 minimizes the brightness of the display in operation 505. More specifically, in the dimming mode, the electronic device 100 can display the dimmer screen by minimizing the luminance of the display, and thus reduce the power consumption. For example, when the display of the electronic device 100 supports the AMOLED type, the electronic device 100 can control the emission of the self-emitting device by reducing the current supplied to the transistors corresponding to the R/G/B subpixels of each display pixel of the screen, and thus minimize the brightness of the display.

In operation 507, the electronic device 100 lowers the interface clock and the refresh rate. More specifically, the electronic device 100 can decrease the data amount sent to the display 130 by lowering the interface clock, decrease the number of times that the display 130 displays the image and the number of access times to the output buffer to read the image by lowering the refresh rate, to thus display the dimmer screen than the screen of the related-art dimming mode and reduce the power consumption. For example, the electronic device 100 using the MIPI can decrease the refresh rate from 60 Hz to 40 Hz and the interface clock from 500 Hz to 400 Hz. Accordingly, the power consumption of the electronic device 100 is declined from 295 mA to 265 mA. In so doing, the electronic device 100 can lower the refresh rate and the interface clock by the preset hopping unit or to the refresh rate and the interface clock of the dimming mode prestored in the data storage 111.

The exemplary embodiments and various functional operations of the present invention described herein can be implemented in computer software, firmware, hardware, or in combinations of one or more of them including the structures disclosed in this specification and their structural equivalents. The exemplary embodiments of the present invention can be implemented as one or more computer program products, that is, one or more data processors, or one or more modules of computer program instructions encoded on a non-transitory computer-readable medium to control the device.

The non-transitory computer-readable medium may be a machine-readable storage medium, a machine-readable storage substrate, a memory device, a material affecting a machine-readable propagated stream, or a combination of one or more of these. The term 'data processor' encompasses every device, apparatus, and machine including, for example, a programmable processor, a computer, a multiple processors, or a computer, for processing data. The device can be added to the hardware and include a program code for creating an execution environment of a corresponding computer program, for example, a code for constituting processor firmware, a protocol stack, a database management system, an operating system, or a combination of one or more of these.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reducing power consumption of an electronic device, the method comprising:

setting a luminance of a display to a minimum;

lowering a refresh rate of the display to decrease the number of images displayed on the display; and lowering an interface clock of the display to decrease an amount of data sent from a memory to an image processor.

2. The method of claim 1, wherein the setting of the luminance of the display to a minimum comprises:

comparing a remaining battery power with a threshold; and when the remaining battery power falls below the threshold, minimizing the luminance of the display.

3. The method of claim 1, wherein the setting of the luminance of the display to a minimum comprises setting a luminance of a display to a minimum in a menu.

4. A non-transitory computer-readable storage medium storing one or more programs comprising instructions which, when executed by an electronic device, cause the device to execute the method according to claim 1.

5. An electronic device for reducing power consumption, the electronic device comprising:

one or more processors;

a display;

a memory; and one or more programs stored in the memory and configured for execution by the one or more processors, wherein the one or more programs comprise an instruction for minimizing a luminance of the display and reducing a data amount sent to the display, lowering a refresh rate of the display to decrease the number of images displayed on the display, and lowering an interface clock of the display to decrease an amount of data sent from a memory to an image processor.

6. The electronic device of claim 5, wherein the one or more programs comprise an instruction for comparing a remaining battery power with a threshold, and minimizing the luminance of the display when the remaining battery power falls below the threshold.

7. An electronic device for reducing power consumption, the electronic device comprising:

one or more processors;

a display; and a memory, wherein the processor is configured to:

minimize a luminance of the display, lower a refresh rate of the display to decrease the number of images displayed on the display, and lower an interface clock of the display to decrease an amount of data sent from a memory to an image processor.

8. The electronic device of claim 7, wherein the processor compares a remaining battery power with a threshold, and minimizes the luminance of the display when the remaining battery power falls below the threshold.

* * * * *